Patented Jan. 4, 1944

2,338,580

UNITED STATES PATENT OFFICE 2,338,580

WATER BASE PAINT COMPOSITION

Charles R. Fordyce, Rochester, N. Y., assignor to Eastman Kodak Company, Rochester, N. Y., a corporation of New Jersey No Drawing. Application March 7, 1939, Serial No. 260,385

4 Claims. (Cl. 106—193)

This invention relates to a water-base paint having, as an essential constituent thereof, the ammonium salt of an acid dicarboxylic acid ester of a highly polymerized compound, such as cellulose, its derivatives, or a polyvinyl compound.

The most common water-base paint is whitewash, ordinarily composed of a mixture of lime and water, possibly with other ingredients, such as glue, salt, or the like mixed in. Whitewash usually has the disadvantage that the coatings thereof have a tendency to chalkiness and cannot be washed without detrimentally effecting the coating. One object of my invention is to provide a water-base paint which gives a coating having good adherence on various types of porous material, such as wood, stone or the like. Another object of my invention is to provide a water-base paint which will give a coating that is washable and does not exhibit a tendency towards chalking. Other objects of my invention will appear herein.

I have found that if a composition, comprising the ammonium salt of a dicarboxylic acid ester of a highly polymerized compound dissolved in water and containing a small proportion of pigment, is applied to a surface, such as by brushing, and allowed to stand for sufficient time for the ammonia to remove itself therefrom that a good washable coating is formed. My composition is ordinarily prepared by mixing an acid dicarboxylic acid ester of the highly polymerized compound with water and subsequently adding ammonia to the mixture until the ester dissolves in the water. Then the desired amount of pigment is added thereto. The dicarboxylic acid esters of highly polymerized compounds which I have found useful in my paint composition, are cellulose phthalate, cellulose succinate, cellulose acetate phthalate, cellulose acetate succinate, polyvinyl acetate phthalate, polyvinyl acetate succinate, polyvinyl succinate, polyvinyl phthalate, polyvinyl acetal succinate and polyvinyl acetal phthalate. The ester, which is used, should have sufficient carboxyl groups so that it is soluble in a very dilute aqueous solution of ammonia. As succinyl groups have a lesser group weight than phthalyl groups, the minimum amount of succinyl necessary need not be as great as with the corresponding phthalyl compounds. For instance, the free carboxyl content of a succinyl ester of cellulose should be at least 15% and preferably 30–35%. For phthalyl esters of cellulose the phthalyl content should be at least 20% and preferably 30–60%. For the simple cellulose phthalates a higher range of phthalyl, such as 40–60% is desirable, while for the mixed esters, such as acetate phthalate, a range of 30–40% is satisfactory. The same qualifications, as to succinyl and phthalyl contents, apply also to the polyvinyl esters, such as of polyvinyl alcohol, polyvinyl acetate and polyvinyl acetal, the sole criterion being the presence of sufficient phthalyl or succinyl with free carboxyl groups present to form a water-soluble ammonium salt.

As for the concentration of the salt of the dicarboxylic acid ester in water, this depends upon the method of application of the paint. For instance, for brushing, a solution of 5–15% and preferably 10% of the ester would ordinarily be most suitable. For dipping, a heavier composition is desired and, therefore, a more concentrated solution of the ester is preferred. For spraying, on the other hand, a thin solution is desired and the concentration of ester in the solution is preferably low, such as 5% down to 2% or even less, depending on the particular conditions.

The amount of pigment incorporated may be from 3–25%, based on the weight of ester used. However, as a rule, not more than 10% is necessary or desirable, as excessive amounts increase the tendency towards chalkiness. Any of the well-known water-insoluble pigments might be employed. For instance, for a white paint, titanium oxide, barium sulfate, zinc oxide or white lead might be incorporated in the composition. For colors of a brown or red nature, iron oxides are suitable. For yellow, cadmium sulfide has been found to be quite satisfactory, while ultramarine or Prussian blue might be used to impart blue. Various other pigments, such as carbon black, chrome yellow, chrome green, cobalt blue and American vermilion might also be incorporated either alone or in admixture with other pigments. If desired, a white pigment might be employed and dyes can then be used to get the desired coloration. The dye might be incorporated either by dyeing the pigment and adding the pigment to the composition or, if the dye is water soluble, adding it directly to the composition in sufficient amount to give color of the desired depth. When my water-base paint is applied to a surface, the water evaporates from the coating in a short time, such as about an hour, depending, of course, on the conditions. The coating does not become water insoluble, however, until the ammonia present passes off. I have found that under dry, warm conditions, approximately 12 hours is sufficient for the coating to become washable with water, while under moist, cool conditions, approximately 2 days is often necessary. With more moderate conditions a time between these extremes may be used. Various conditions, such as sunlight, moving air, or the like, which are conducive to removing the ammonia from the layer, contribute to the speed of drying.

Some surfaces are not as conducive to adherence of coatings as other surfaces. For instance, the coating of a polished surface, such as polished metal, or stone, might result in a coating which easily strips off therefrom. To enhance the adhesive ability of my paint composition to all surfaces and particularly to polished surfaces, a small amount of an adhesive, such as casein, gelatin, glue or the like, should be incorporated in the paint composition.

The following example illustrates the coating of a surface with a composition in accordance with my invention:

A solution was prepared by dissolving 10 parts of cellulose acetate phthalate, of 25% phthalyl content, in 90 parts of water with the addition of just sufficient ammonia water to render the cellulose ester soluble. One part of finely powdered, titanium oxide pigment was added and the mixture was thoroughly stirred to give complete uniformity. The resulting white paint was applied by brushing it upon a wood surface. Upon drying, a white painted surface of good quality was obtained. The coated surface was dry to the touch within about one hour, but was still soluble in water, as shown by washing with a damp cloth. After 12–24 hours, the water solubility of the surface had disappeared and the surface could be readily washed with water without any detrimental effect upon the coating.

A composition, less expensive, which might be employed, may be prepared by mixing my paint composition with whitewash, such as in equal amounts providing there is nothing present in the particular whitewash used which is not compatible with the ingredients of my paint composition. The resulting mixture, when brushed upon a surface and dried for a sufficient time, gives a coated surface more resistance to the effects of water than if the surface had been coated with whitewash.

I claim:

1. A water-base paint composition adapted to form a coating upon a surface which upon standing becomes a washable protective layer over said surface, which composition essentially consists of a water solution of an ammonium salt of a phthalic acid ester of cellulose having a phthalyl content of at least 20% and 3–10% (based on the weight of the ester) of a water insoluble pigment.

2. A water-base paint composition adapted to form a coating upon a surface which, upon standing, becomes a washable protective layer over said surface, which composition essentially consists of a water solution of an ammonium salt of a phthalic acid ester of cellulose having a phthalyl content of at least 20% and 3–10% (based on the weight of the ester) of titanium dioxide.

3. The water-base paint composition adapted to form a coating upon a surface which, upon standing, becomes a washable protective layer over said surface, which composition essentially consists of a water solution of an ammonium salt of cellulose acetate phthalate having a phthalyl content of at least 20% and 3–10% (based on the weight of the ester) of a water-insoluble pigment.

4. The water-base paint composition adapted to form a coating upon a surface which, upon standing, becomes a washable protective coating over said surface, which composition essentially consists of a water solution of an ammonium salt of cellulose acetate phthalate having a phthalyl content of at least 20% and 3–10% (based on the weight of the ester) of titanium dioxide.

CHARLES R. FORDYCE.